United States Patent
Smith

(10) Patent No.: US 8,327,977 B2
(45) Date of Patent: Dec. 11, 2012

(54) FLOOR COVERING

(75) Inventor: Robert N. Smith, Lancashire (GB)

(73) Assignee: James Halstead PLC, Radcliffe, Manchester (GB)

( * ) Notice: Subject to any disclaimer, the term of this patent is extended or adjusted under 35 U.S.C. 154(b) by 0 days.

(21) Appl. No.: 13/001,415

(22) PCT Filed: May 22, 2009

(86) PCT No.: PCT/GB2009/001297
§ 371 (c)(1),
(2), (4) Date: Feb. 16, 2011

(87) PCT Pub. No.: WO2009/156707
PCT Pub. Date: Dec. 30, 2009

(65) Prior Publication Data
US 2011/0147120 A1     Jun. 23, 2011

(30) Foreign Application Priority Data
Jun. 28, 2008  (GB) .................................. 0811880.4

(51) Int. Cl.
*E04B 1/84* (2006.01)

(52) U.S. Cl. .................... 181/294; 181/284; 181/296

(58) Field of Classification Search ................. 181/294, 181/284, 296
See application file for complete search history.

(56) References Cited

U.S. PATENT DOCUMENTS

| | | | |
|---|---|---|---|
| 4,126,727 A | 11/1978 | Kaminski | |
| 4,842,095 A * | 6/1989 | Rozek | 181/207 |
| 6,103,053 A * | 8/2000 | Saylor, Jr. | 156/280 |
| 6,596,389 B1 * | 7/2003 | Hallett et al. | 428/317.9 |
| 6,767,630 B2 * | 7/2004 | Okuyama | 428/354 |
| 6,953,205 B2 * | 10/2005 | Friest et al. | 280/770 |
| 7,205,043 B1 * | 4/2007 | Spero et al. | 428/292.1 |
| 7,263,028 B2 * | 8/2007 | Thomas et al. | 367/1 |
| 7,279,214 B2 * | 10/2007 | Nicolai et al. | 428/137 |
| 7,973,106 B2 * | 7/2011 | Fisk et al. | 524/556 |
| 2003/0062217 A1 * | 4/2003 | Sheng et al. | 181/290 |
| 2005/0223664 A1 * | 10/2005 | Gardner | 52/235 |

FOREIGN PATENT DOCUMENTS

| | | |
|---|---|---|
| BE | 1016807 A3 | 7/2007 |
| DE | 202005019427 U1 | 4/2006 |
| FR | 2859229 A1 | 3/2005 |
| GB | 903387 | 8/1962 |
| GB | 1041149 | 9/1966 |
| GB | 2338435 | 12/1999 |
| WO | 9939042 | 8/1999 |
| WO | 2005035680 A2 | 4/2005 |
| WO | 2006126930 A1 | 11/2006 |

* cited by examiner

*Primary Examiner* — Forrest M Phillips
(74) *Attorney, Agent, or Firm* — Barlow, Josephs & Holmes, Ltd.

(57) ABSTRACT

A floor covering having slip-resistance and sound attenuation properties, particularly for reducing levels of sound resulting from high impact interactions. The floor covering includes at least a first layer and a second layer, wherein the first layer includes a particulate material at least partially embedded therein, and the second layer is capable of providing a sound attenuation effect with an acoustic impact sound reduction of at least about 15 decibels.

20 Claims, 1 Drawing Sheet

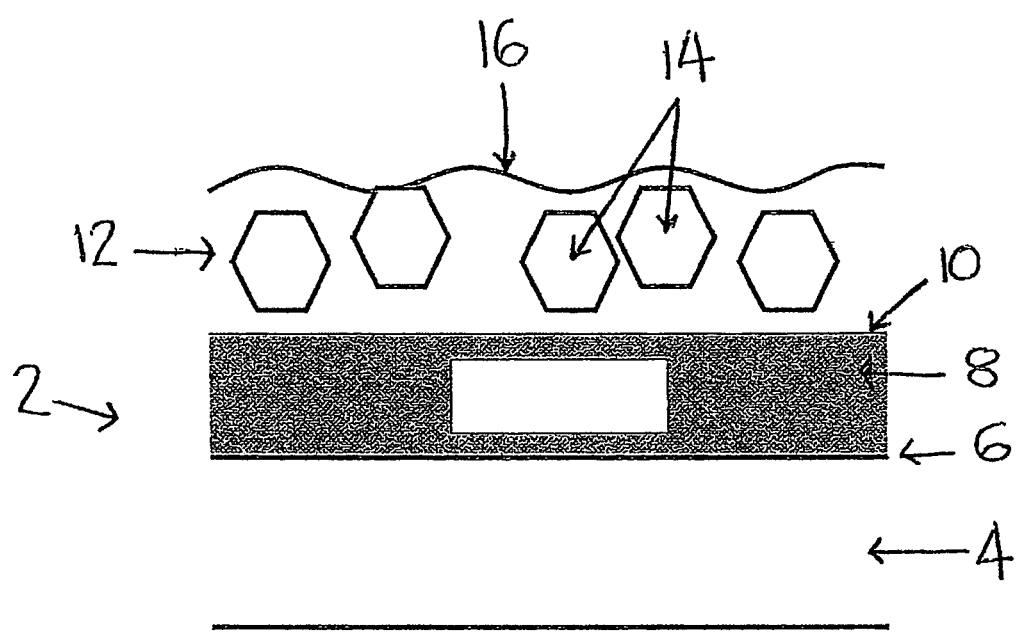

FLOOR COVERING

The present invention relates to a floor covering having slip-resistance and sound attenuation properties, particularly for reducing levels of sound resulting from high impact interactions.

The ability to reduce the levels of sound resulting from high impact interactions is a desirable feature in many residential and commercial establishments to maintain a more peaceful and noise-free environment. This is particularly the case in establishments such as homes, schools, hospitals, care homes, laboratories, shops, cafes and restaurants, sports centres, community buildings, and reception/foyer areas of buildings. Such establishments usually hence arrange for the installation of flooring having favourable acoustic properties.

In addition to the enhanced acoustic properties of such flooring, it is often the case that such establishments have areas which are normally dry but which may also be also prone to liquid spillages. These establishments hence also require floor coverings which offer an enhanced slip resistance in order to reduce the likelihood of accidents caused by people slipping.

According to the UK Health and Safety Executive (HSE), there are over 35,000 injuries per year caused by slips and trips in the UK alone. This accounts for approximately 1 of every 3 major non-fatal injuries, as well as approximately 1 in every 5 injuries in the workplace. Floor coverings having higher coefficients of friction are one way of trying to reduce the number of such injuries. A number of floor coverings providing slip-resistance properties are currently commercially available.

There are a number of floor coverings already in existence which provide either sound attenuation characteristics or a slip-resistant floor covering, but not both. For example, U.S. Pat. No. 6,103,053 discloses a flooring material which has slip resistance properties but no reference is made to any particular sound attenuation characteristics. U.S. Pat. No. 4,126,727 discloses a flooring material which comprises a particulate material only for optical effect and does not mention that the flooring material possesses any sound attenuation characteristics or that it is slip-resistant. Finally, WO 99/39042 discloses a surface covering for wear and stain resistance comprising aluminium oxide particles in an outer layer, but which does not provide any sound attenuation characteristics or slip-resistance.

If an establishment requires sound attenuation in addition to a slip-resistant floor covering, at present, the installation of two discrete products is required. A separate acoustic underlayment needs to be installed in combination with an anti-slip or safety floor covering. This combination has significant disadvantages; the installation procedure of the two separate products is complicated, there is differential thermal expansion and differential movement between the products, the production costs are naturally higher for two products than they would be for one, and also the installation of two products is more expensive both in monetary and time terms.

It would therefore be desirable to provide a single floor covering which has both slip-resistance properties and sound attenuation properties.

Therefore, in accordance with the present invention there is provided a floor covering comprising at least a first layer and a second layer, wherein the first layer comprises a particulate material at least partially embedded therein, and the second layer is capable of providing a sound attenuation effect with an acoustic impact sound reduction of at least about 15 decibels.

By "sound attenuation effect" it is meant that the second layer is capable of reducing the volume and intensity of a sound when an object impacts upon the floor covering. Typically, the sound can be reduced by at least about 19 decibels.

According to one embodiment of the invention, the material used in the second layer to provide the sound attenuation effect is a foam-based material. It is typically produced by including in a plastisol mix one or more chemical substances which emit gas when exposed to heat during the production process, thus creating the bubbles and foam effect in the material.

The first stage of the process is the gelation of the plastisol, followed by an increase in the heat applied and formation of the gas or (gases), which creates small pockets or bubbles in the layer causing the layer to expand and form a foam.

The design of the foam layer involves establishing a compromise between two conflicting properties, those being residual indentation—which is typically kept less than about 0.2 mm—and acoustic impact sound reduction, which is as much as or greater than about 15 decibels. This compromise is achieved by increasing or decreasing the blowing agent and process temperature, thus changing the density, stiffness and foam thickness.

Typically, the foam layer comprises PVC (polyvinyl chloride), a plasticiser, filler, a stabiliser and a blowing agent.

According to another embodiment of the invention, the first layer of the floor covering is a transparent wear layer. This layer comprises a quantity of a particulate material having a high coefficient of friction which improves the slip resistance and provides sustainable slip resistance throughout the life of the product.

Typically, the transparent wear layer comprises one or more substances selected from PVC, a plasticiser, a stabiliser, an anti-static agent and/or a bacteriostat.

According to one embodiment, the particulate material having a high coefficient of friction is aluminium oxide, such as white or clear aluminium oxide, but it may also be another particulate material having a high coefficient of friction such as quartz or a silicon carbide. The particulate material is typically substantially completely embedded in the transparent wear layer.

The particles of the particulate material typically have an average size of between about 0.30-0.75 mm, more typically between about 0.59-0.71 mm, across their widest points. They are typically distributed across the covering in an amount of about 100-300 g/m$^2$, typically about 200 g/m$^2$. The combination of the transparent wear layer and the clear particulate material allows any floor designs situated under the first layer to be highly visible, without being obscured by particles as is the case with some other slip-resistant floor coverings.

According to a further embodiment, the floor covering also comprises a third layer which is a reinforced glass fibre layer. This layer improves the processing capability of the floor covering and also improves the dimensional stability of the covering and its ability to resist impact damage and indentations. A PVC impregnated glass fibre reinforcement is typically used. It is typically located directly on top of the second layer.

According to a further embodiment, the floor covering also comprises a fourth layer which is a print layer. This layer provides the aesthetic aspect of the covering. Any print design can be used thereon as desired, such as wood or stone effect designs as natural replications, or even abstract designs. This layer is typically located immediately above the third layer. The print designs are typically applied using a four station gravure printing system.

Typically, the print layer comprises a least one substance selected from PVC, a plasticiser, filler, a stabiliser, a pigment and/or an anti-static agent.

In the layers, for example, the plasticiser may be di-isononyl phthalate, the filler may be calcium carbonate, the stabiliser may be zinc oxide, the blowing agent may be azodicarbonamide, the stabiliser may be calcium zinc, the anti-static agent may be an antistatic plasticiser such as Markstat 60, and the bacteriostat may be an antimicrobial additive. While these materials are exemplary of what materials could be used to perform each of these functions, they are of course not the only materials which could be used and other such materials are also envisaged within the scope of the invention.

According to a further embodiment, the floor covering also comprises a surface finish on the first layer. The first layer is typically embossed with a surface finish specifically designed to impart the necessary slip-resistance whilst exhibiting low soil pick-up tendencies. This can be achieved by a combination of micro- and macro-scale emboss patterns which may range from about 30 µm to about 160 µm, respectively, in depth.

Different emboss patterns are used dependent upon the decoration of the print layer. For example, a wood grain emboss has been specifically designed to suit the design of a reproduction wood effect print layer.

The micro-scale embossing will typically result in indentations of between about 40-50 µm depth, more typically between about 42-45 µm. The macro-scale embossing will typically result in indentations of between about 100-120 µm, more typically about 110 µm. The macro-scale emboss typically covers between about 10-20%, more typically about 15%, of the surface area of the covering.

The particle size of the particulate material in the first layer ensures that as the emboss begins to wear, the particulate material comes into play to impart sustainable slip-resistance properties throughout the life of the product.

According to a further embodiment, the floor covering also comprises a fifth layer which is an approximately 100% radiation curing lacquer system containing a quantity of a particulate material having a high coefficient of friction. According to one embodiment, the particulate material having a high coefficient of friction may be silica or aluminium oxide, such as white or clear aluminium oxide, but it may also be another particulate material having a high coefficient of friction such as quartz or a silicon carbide. The particulate material in the fifth layer may or may not be the same particulate material which is present in the first layer.

The lacquer typically comprises a cross-linking polymer, such as polyurethane (PU), polyester, acrylic or an epoxy-containing material. The polymer is cross-linked by exposure to radiation, such as high energy ultra-violet radiation.

This fifth layer typically has a dry film thickness in the region of about 15-25 µm, more typically about 20 µm. This results in an improved resistance to scuffing, chemical staining, abrasion, picking up of dirt, and an improvement in initial slip resistance.

Typically, the floor covering of the invention is between about 3.5-4.0 mm thick, with the first layer being typically between about 0.5-0.7 mm thick, although these respective thicknesses may be increased or reduced as required.

The present invention makes it possible for what has always previously been two separate and discrete products to be combined in one single heterogeneous product. This allows for savings to be made on transportation and installation costs, installation time and problems encountered when installing two separate products, the cost of the product itself as it will inevitably be cheaper to produce and sell than two separate products, and packaging.

In order to manufacture the floor covering of the invention, a number of technical issues regarding the production required addressing. Many process lines for manufacturing floor coverings do not have the ability to turn the product over and back again to add the various layers together as is required for the invention. Additionally, a special design of oven belt is required in order to avoid marking or damaging the foam as can occur on conventional oven belts as the foam expands (blows), and also the embossing has to be very carefully controlled to enable sufficient force to be applied to the top surface whilst not damaging the foam layer on the bottom surface.

The floor covering of the invention is substantially resistant to permanent stains from most or all conventional household materials. It is also long-lasting and durable, maintaining the 'new-look' appearance for longer. As the particulate material is typically embedded within the clear upper layer, particles are not lost or broken from contact as they are in some existing slip-resistant floor coverings.

The floor covering of the invention has been specifically designed to be HSE compliant, i.e. to have a rating of 36 or more in the HSE pendulum coefficient of friction (CoF) test and 20 µm or more in the surface roughness requirement, both of which values represent a low slip potential.

Additionally, the sound attenuation layer, which is typically a foam backing layer, improves the underfoot comfort in comparison with standard compact safety floors. This provides benefits where the flooring is used in areas where people are required to stand for prolonged periods of time, such as behind bar areas, cafes or in retail establishments, as the covering is ergonomically designed to provide anti-fatigue benefits.

According to a further embodiment, the floor covering may incorporate a bacteriostat material to inhibit or prevent the growth of fungus and/or bacteria, and/or it may incorporate a UV stabilising material and/or a flow aid such as fumed silica. Typically, any bacteriostat material would be incorporated in the transparent wear layer.

The floor covering of the invention is flexible and easy to install. It is primarily intended for use in residential and commercial establishments where high impact sound reduction is important, and/or for areas which are normally dry but are liable to be subject to liquid spillages, making the slip-resistant property of the covering an important consideration. This is particularly the case in establishments such as homes, schools, hospitals, care homes, laboratories, shops, cafes and restaurants, sports centres, community buildings, and reception/foyer areas of buildings.

According to a further aspect of the invention, there is provided a method of manufacturing a floor covering, comprising the steps of
i) providing a first layer having a particulate material at least partially embedded therein;
ii) providing a second layer capable of providing a sound attenuation effect with an acoustic impact sound reduction of at least about 15 decibels; and
iii) binding the first and second layers together.

Also provided is a method of providing sound attenuation and/or slip resistance comprising using a floor covering according to the invention.

According to one embodiment of the invention, when manufacturing the floor covering of the invention, the layers thereof are typically prepared in the following order: the starting point is the third layer, to which the fourth layer is added and a print design is applied. The second layer is added to the third layer on the opposite side from the fourth layer. The first layer is then applied and a quantity of the particulate material is contacted with the first layer while it is still wet, such that some of the particulate material sticks to the first layer and sinks into it. The second layer is treated (such as, but not limited to, in an oven to create a foam sound attenuation material), and the first layer is embossed. Finally, the fifth layer is applied and cured.

According to one embodiment of the invention, the floor covering is manufactured as follows:

Non-woven glass fibre is coated and gelled onto a heated drum. An additional layer is then added which forms the base for subsequent printing; this layer is gelled around a heated drum. A four station gravure printing system then applies the print decoration. The product is inverted and a chemical foam backing layer is applied and gelled. It is inverted again and a transparent wear layer is applied. While the wear layer is still wet, aluminium oxide particles are scattered onto the surface. As the layer is wet, the particles sink into the wear layer. Excess particles are removed by vacuum pick-up. The wear layer is then gelled and the foam backing is blown in an oven, prior to the wear layer being embossed and cooled. The polyurethane coating is then applied and cured. The final product is then inspected, cut into 20 m long rolls and packaged.

The invention will now be described further by way of example with reference to the following FIGURE which is intended to be illustrative only and in no way limiting upon the scope of the invention.

FIG. 1 shows a representation of a floor covering in accordance with the invention.

FIG. 1 shows a floor covering 2 having slip-resistance and sound attenuation properties, which has a foam backing layer 4 as its bottom layer. This is coated with a layer of PVC impregnated glass fibre reinforcement 6. A print layer 8 is situated on top of the glass fibre reinforcement 6, and a print design 10 is incorporated thereon, in this case a wood design (not shown).

A transparent wear layer 12 comprising white aluminium oxide particles 14 (average particle size 0.59-0.71 mm) in a distribution of 200 g/m² is on top of the print design 10. The transparency of the wear layer 12 allows the print design 10 to be visible. The surface 16 of the transparent wear layer 12 is embossed with micro- and macro-scale embossed patterns. The micro-scale emboss depth is 43 μm and the macro-scale emboss depth is 110 μm. The surface 16 of the floor covering 2 has a coating of polyurethane. The polyurethane is 15-20 g/m² coatweight containing silica particles having an approximate particle size of 20 μm.

It is of course to be understood that the present invention is not intended to be restricted to the foregoing examples which are described by way of example only.

The invention claimed is:

1. A method of manufacturing a floor covering, comprising the steps of:
    providing a first layer having an upper surface which receives a print decoration;
    inverting said first layer;
    applying a backing layer on a back surface of said first layer, said backing layer being capable of providing a sound attenuation effect with an acoustic impact sound reduction of at least about 15 decibels;
    inverting again said first layer;
    applying a wear layer onto said upper surface of said first layer over said print decoration; and
    embedding a particulate material into said wear layer;
    wherein the first layer and backing layer are bound together into a single construct prior to installation of the floor covering.

2. The method of claim 1 wherein said particulate material is embedded into said wear layer while said wear layer is still wet.

3. The method of claim 1 wherein excess particulate material is removed by vacuum pick-up.

4. The method of claim 2 wherein excess particulate material is removed by vacuum pick-up.

5. The method of claim 1 further comprising the step of embossing said wear layer.

6. The method of claim 1 further comprising the step of cooling said wear layer.

7. The method of claim 5 further comprising the step of cooling said wear layer.

8. The method of claim 1 further comprising the step of applying a polyurethane coating over said wear layer.

9. The method of claim 1 further comprising the step of applying a polyurethane coating over said wear layer.

10. The method of claim 5 further comprising the step of applying a polyurethane coating over said embossed wear layer.

11. The method of claim 7 further comprising the step of applying a polyurethane coating over said embossed and cooled wear layer.

12. A method of manufacturing a floor covering, comprising the steps of:
    providing a first layer
    applying a print decoration on an upper surface of said first layer;
    inverting said first layer;
    applying a backing layer on a back surface of said first layer, said backing layer being capable of providing a sound attenuation effect with an acoustic impact sound reduction of at least about 15 decibels;
    gelling said backing layer;
    inverting again said first layer;
    applying a wear layer onto said upper surface of said first layer over said print decoration;
    embedding a particulate material into said wear layer;
    removing excess particulate material;
    gelling said wear layer;
    embossing said wear layer;
    cooling said wear layer;
    applying a polyurethane coating over said embossed and cooled wear layer,
    wherein the first layer and backing layer are bound together into a single construct prior to installation of the floor covering.

13. The method of claim 12 wherein said particulate material is embedded in said wear layer while said wear layer is still wet.

14. The method of claim 12 wherein said excess particulate material is removed by vacuum pick-up.

15. The method of claim 13 wherein said excess particulate material is removed by vacuum pick-up.

16. A floor covering comprising:
    a transparent first layer having an upper surface and a print decoration on said upper surface;
    a wear layer on said upper surface of said first layer applied over said print decoration;
    a particulate material substantially embedded within said wear layer;
    a pattern embossed into said wear layer;
    a polyurethane layer applied on said wear layer, a backing layer applied onto a back surface of said first layer, said backing layer providing a sound attenuation effect with an acoustic impact sound reduction of at least about 15 decibels, wherein said floor covering comprises a single construct at the time of installation onto a floor.

17. The floor covering of claim 16, wherein said first layer is glass fiber.

18. The floor covering of claim 16 wherein said backing layer is a foam.

19. The floor covering of claim 16 further comprising a biostat material.

20. The floor covering of claim 16 further comprising a U/V stabilizing material.

* * * * *